United States Patent [19]
Cirelli

[11] 3,984,900
[45] Oct. 12, 1976

[54] COUPLING DEVICE
[75] Inventor: Frank Cirelli, East Providence, R.I.
[73] Assignee: James R. Johnston, San Diego, Calif.
[22] Filed: Aug. 29, 1975
[21] Appl. No.: 608,825

[52] U.S. Cl. ................................. 24/238; 24/242
[51] Int. Cl.² .................................... A44B 13/00
[58] Field of Search ............... 24/238, 241 SL, 242, 24/239

[56] References Cited
UNITED STATES PATENTS
1,240,381  9/1917  Smith ............................ 24/241 SL
2,010,277  8/1935  Smith ............................ 24/241 SL Primary Examiner—Bernard A. Gelak

[57] ABSTRACT

A coupling device having an integral metal member folded over on itself forming two parallel sides which slidably receives another integral metal member folded over on itself; the first member having an opening in the top thereof for receiving coupling loops depending upon its slidable relationship with the first member; the second member having at least one outwardly protruding blister on each side thereof for actual slidable contact with the inside walls of the second member and maintaining a spatial relationship when assembled so that the entire coupling device can be plated after assembly.

1 Claim, 8 Drawing Figures

COUPLING DEVICE

PRIOR ART

The following patents are the closest prior art of this patent application known to the applicant: U.S. Pat. Nos. 1,565,188, 1,394,666, 3,427,691, 1,201,175, 3,212,153, 1,200,318.

BRIEF DESCRIPTION OF THE INVENTION

The present invention relates to a coupling device and more particularly to a coupling device which can be plated after assembly.

According to the invention, a flat elongated outer member having first and second parallel sides joined by a bend at one edge thereof is provided having an opening in the folded edge for receiving a coupling loop therein. A flat elongated inner member also having first and second parallel sides joined by a bend at one edge thereof is dimensioned for being slidably received by the outer member. The inside member also has a recess in the top folded portion thereof, complementing the recess in the folded edge of the outer member for receiving a coupling loop therein and slidably closing the common opening. At least one dimple is provided on each side of the inner member forming an outwardly going protuberance for actual engagement of the outer member when assembled. This feature allows the entire coupling device to be plated after assembly since all of the surfaces will be exposed except the very negligible area where the dimples contact the inner walls of the outer member.

An object of the present invention is the provision of a coupling device for coupling two eyes or loops together.

Another object of the invention is the provision of a coupling device which can be plated after assembly.

Other objects and many of the attendant advantages of the present invention will be readily appreciated as the same becomes better understood by reference to the following detailed description when considered in connection with the accompanying drawing in which like reference numerals designate like parts throughout the Figures thereof and wherein.

DETAILED DESCRIPTION OF THE DRAWING

Figure 1:
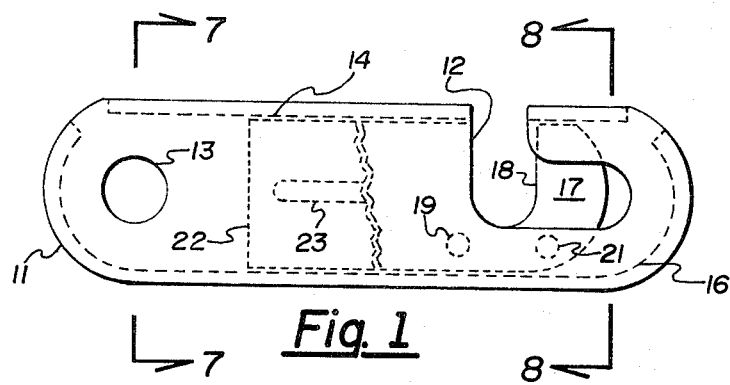
FIG. 1 is a side elevational view illustrating portions of two embodiments of the present invention.
Figure 2:
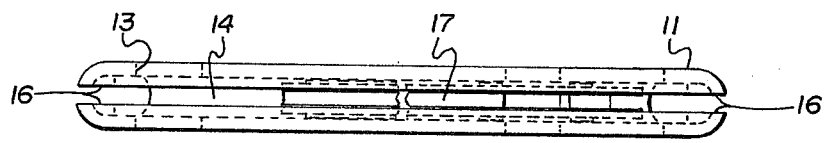
FIG. 2 is a top view of the embodiment of FIG. 1.

Referring to FIGS. 1 and 2, outer member 11 has an L-shaped recess 12 and an aperture 13. The top portion of outer member 11 has a fold 14 and the bottom portion of outer member 11 has a pair of folds 16. Inner member 17 has a top recess 18 with a pair of dimples on each surface thereof 19 and 21. Inner member 17 also has an elongated dimple or protuberance 23 on each side thereof. Inner member 17 has a fold 24 at the top edge thereof.

Figure 3:
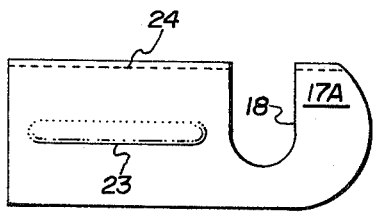
FIG. 3 is a side elevational view of the inner member of one embodiment of the present invention.
Figure 4:
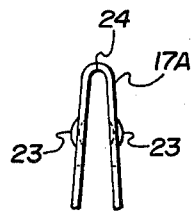
FIG. 4 is an end view of the embodiment of FIG. 3.

Referring to FIGS. 3 and 4, a modification of inner member 17 is shown at 12A which only has elongated dimples or protuberances 23.

Figure 5:
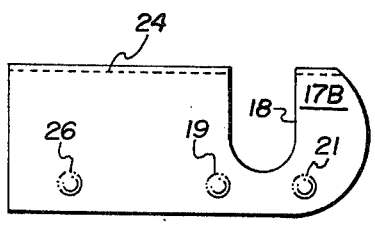
FIG. 5 is a side elevational view of another embodiment of the inner member of the present invention.
Figure 6:
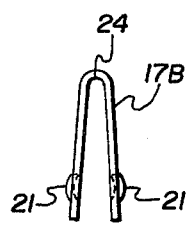
FIG. 6 is an end view of the embodiment of FIG. 5.

Referring to FIGS. 5 and 6, a modification of member 17 is shown at 17B which has additional dimples 26 in place of elongated members 23, but also includes dimples 19 and 21.

Figure 7:
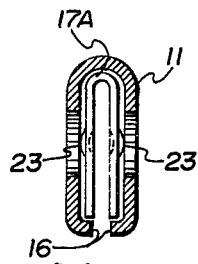
FIG. 7 is a sectional view taken along lines 7 — 7 of FIG. 1.

Referring to FIG. 7, outer member 11 is shown having slidably received inner member 17A with elongated dimple 23 creating a small space between the outer surface of inner member 17 and the inner surface of outer member 11.

Figure 8:
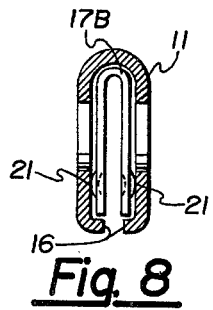
FIG. 8 is a sectional view taken along lines 8 — 8 of FIG. 1.

Referring to FIG. 8, outer member 11 is shown having slidably received inner member 17B. Here it can be seen that dimples 21 along with dimples 19 (not shown) maintain a small space between the outer wall of inner member 17B and the inner wall of outer member 11.

OPERATION

Referring back to FIGS. 1 and 2, inner member 17 is shown as a composite of inner member 17A (FIG. 3) and inner member 17B (FIG. 5), i.e., it is shown with both the elongated protuberances 23 and the small circular dimples or protuberances 19 and 21. The differences in FIGS. 3 and 5 are as follows: in FIG. 3 all of the small circular dimples have been eliminated and only the elongated dimples 23 remain; in FIG. 5 the elongated dimples or protuberances 23 have been eliminated and an additional small protuberance or dimple 26 has been added (it is to be understood that both the inner and the outer member 17 and 11, respectively, are totally symmetrical in their construction). In operation, one of the inner members is pressed together and inserted in outer member 11. It is then pushed into the position shown in FIGS. 1 and 2 relative to each other so that the opening 12 of the outer member 11 coincides with opening 18 in inner member 17, 17A or 17B. At this time whatever is desired to be coupled is looped within the double recess of 12 and 18 and pulled to the right in FIG. 1 which slides inner member 17 to the right with respect to outer member 11 and effectively closes the top portion of the L-shaped recess 12 of outer member 11. When it is desired to remove the coupled implement, it is pulled to the left against the left side of recess 18 of inner member 17, 17A or 17B, and inner member 17, 17A or 17B then slides to the left within outer member 11, reopening the coinciding recesses.

The sole purpose of outwardly extending dimples or protuberances 19, 21, 23 and 26 is to hold the edges of outside member 11 and the edges of inside member 17, 17A or 17B in a spaced relationship so that substantially the entire outside surface can be plated after assembly. In the absence of this spacing, the edges of the inner and outer members have a tendency to be plated together causing a bridge between them. This necessitates an additional manufacturing step of breaking this bond after plating. Moreover, it has been found that it is much more economical in manufacturing to plate the two members after assembly than plate them separately prior to assembly.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:
1. A coupling device comprising:
a flat elongated outer member, said flat elongated outer member having first and second parallel sides joined at one edge thereof, said first and second sides defining an elongated slot;
at least one recess through said one edge of said flat elongated member adjacent to one end thereof;
a flat elongated inner member, said flat elongated inner member having first and second parallel sides joined at one edge thereof;
at least one opening through said one edge of said flat elongated inner member adjacent to one end thereof; and
at least one protuberance on each of said first and second parallel sides of one of said outer or inner members, said protuberance being in the direction of the first and second parallel sides of the other of said outer and inner member walls.

* * * * *